(12) United States Patent
Warkentin et al.

(10) Patent No.: US 10,534,732 B2
(45) Date of Patent: Jan. 14, 2020

(54) EXPOSING MEMORY-MAPPED IO DEVICES TO DRIVERS BY EMULATING PCI BUS AND PCI DEVICE CONFIGURATION SPACE

(71) Applicant: VMware, Inc., Palo Alto, CA (US)

(72) Inventors: Andrei Warkentin, Wakefield, MA (US); Harvey Tuch, Cambridge, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 156 days.

(21) Appl. No.: 14/754,569

(22) Filed: Jun. 29, 2015

(65) Prior Publication Data
US 2016/0378696 A1    Dec. 29, 2016

(51) Int. Cl.
*G06F 15/00* (2006.01)
*G06F 9/30* (2018.01)
*G06F 13/16* (2006.01)
*G06F 13/42* (2006.01)

(52) U.S. Cl.
CPC ...... *G06F 13/1694* (2013.01); *G06F 13/4282* (2013.01)

(58) Field of Classification Search
CPC .......................... G06F 13/4282; G06F 13/1694
USPC ...................................................... 710/104
See application file for complete search history.

(56) References Cited

U.S. PATENT DOCUMENTS

| | | | | |
|---|---|---|---|---|
| 7,096,473 B2* | 8/2006 | Ruget | ................... | G06F 9/4411 719/321 |
| 2005/0160210 A1* | 7/2005 | Watt | ...................... | G06F 9/4812 710/269 |
| 2011/0145558 A1* | 6/2011 | Khosravi | .............. | G06F 9/4416 713/2 |
| 2014/0281500 A1* | 9/2014 | Ignatchenko | ......... | H04L 9/3263 713/156 |

* cited by examiner

*Primary Examiner* — Chun Kuan Lee
(74) *Attorney, Agent, or Firm* — Patterson + Sheridan, LLP

(57) ABSTRACT

Devices are emulated as PCI devices so that existing PCI drivers can be used for the devices. This is accomplished by creating a shim PCI device with a emulated PCI configuration space, accessed via a emulated PCI Extended Configuration Access Mechanism (ECAM) space which is emulated by accesses to trapped unbacked memory addresses. When system software accesses the PCI ECAM space to probe for PCI configuration data or program base address registers of the PCI ECAM space, an exception is raised and the exception is handled by a secure monitor that is executing at a higher privilege level than the system software. The secure monitor in handling the exception emulates the PCI configuration space access of the emulated PCI device corresponding to the ECAM address accessed, such that system software may discover the device and bind and appropriately configure a PCI driver to it with the right IRQ and memory base ranges.

14 Claims, 4 Drawing Sheets

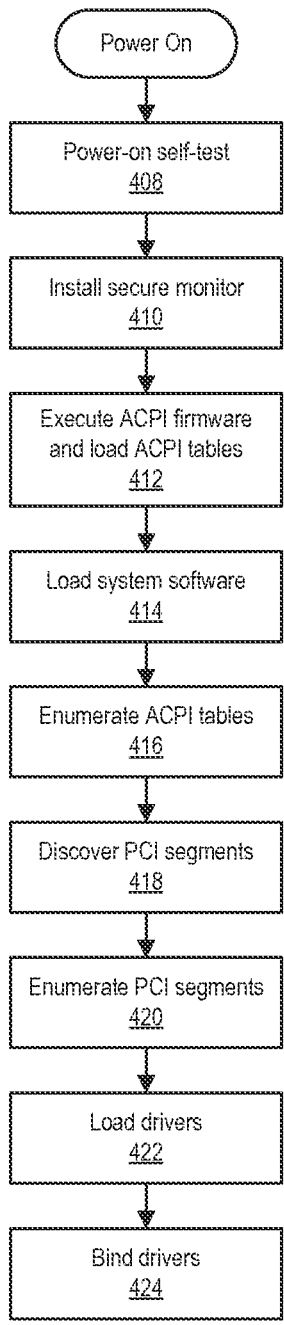
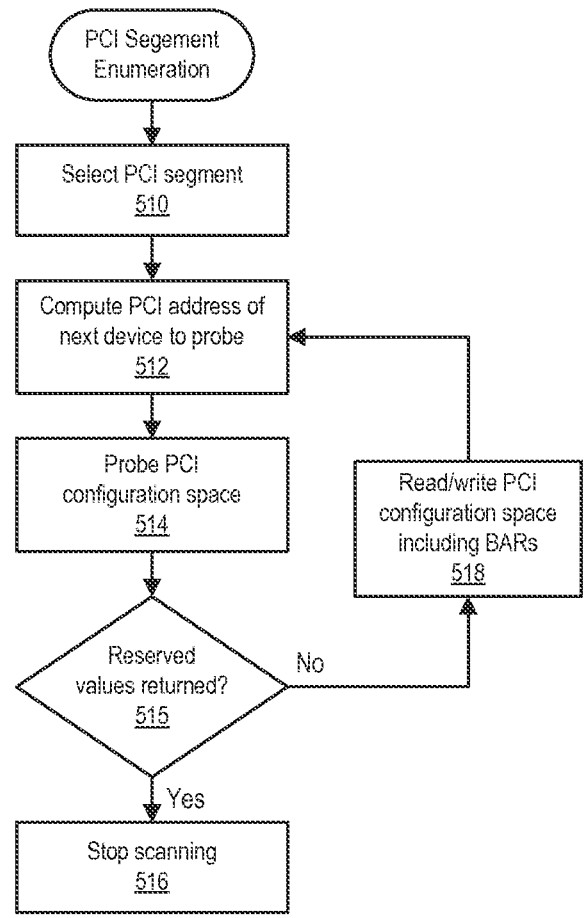
FIGURE 5
FIGURE 4

```
/* Emulated PCIe */
Device (PCI0)
{
  Name (_HID, "PNP0A08") // PCI Express Root Bridge
  Name (_CID, "PNP0A03") // Compatible PCI Root Bridge
  Name(_SEG, 0) // Segment of this Root complex
  Name(_BBN, 0) // Base Bus Number
  Name(_UID, 0)

/*
   * ECAM base. This is the region, access which the
   * secure firmware will trap and treat as accesses to
   * registers on device B:D:F, where address is encoded
   * as address = ECAM + bus << 20 + device << 16 +
   * function << 12 + register
   */
  Method (_CBA, 0, Serialized) {
    Return (0xFFFD0000000)
  }
  Method (_CRS, 0, Serialized) // Root complex resources
  {
    Name (RBUF, ResourceTemplate ()
    {
      WordBusNumber (ResourceProducer,
        MinFixed, // IsMinFixed
        MaxFixed, // IsMaxFixed
        PosDecode, // Decode
        0, // AddressGranularity
        0, // AddressMinimum - Minimum Bus Number
        0, // AddressMaximum - Maximum Bus Number
        0, // AddressTranslation - Set to 0
        1 // RangeLength - Number of Busses
      )

QWordMemory (ResourceProducer,
        PosDecode,
        MinFixed,
        MaxFixed,
        Cacheable,
        ReadWrite,
        0x0000000000000000, // Granularity
        0xAAAAAAAAAAAAAAAA, // MIN
        0xBBBBBBBBBBBBBBBA, // MAX
        0x0000000000000000, // Translate
        0x1111111111111111, // LEN
        ,
        ,
        QWMM
      )
    })

/* PMMS and PMME contain the range of
       addresses decoded by SoC device */

CreateQwordField(RBUF, QWMM._MIN, BMIN)
    Store (PMMS, BMIN)
    CreateQwordField(RBUF, QWMM._MAX, BMAX)
    Store (PMME, BMAX)
    CreateQwordField(RBUF, QWMM._LEN, BLEN)
    Store (PMME, Local0)
    Subtract (Local0, PMMS, BLEN)
    Return (RBUF)
  }

Device (LNKA) {
    Name(_HID, EISAID("PNP0C0F"))
    Name(_UID, 0)
    Method (_CRS, 0, Serialized) {
      Name (RBUF, ResourceTemplate () {
        Interrupt (ResourceProducer,
          Level,
          ActiveHigh,
          Exclusive, , , INRT) {
            CONFIG_SOC0_LNKA
          }
      })

/* Interrupt value is the GSIV. */
      CreateDwordField(RBUF, INRT._INT, INTI)
      Store(INTI, Local0)
      Add (Local0, CONFIG_GIC_SPI_BASE, INTI)
      Return (RBUF)
    }
  }

Name (_PRT, Package (){
    Package (0x04) {
      0x0001FFFF, // Dev 1, Func any
      0x00, // INTA
      LNKA,
      0x0,
    }
  })

Device (RP0) {
    Name(_ADR, 0x00000000) // Dev 0, Func 0
  }
  Device (SOC0) {
    Name(_ADR, 0x00010001) // Dev 1, Func 1
  }
}
```

EXPOSING MEMORY-MAPPED IO DEVICES TO DRIVERS BY EMULATING PCI BUS AND PCI DEVICE CONFIGURATION SPACE

BACKGROUND

Certain processor platforms, such as 64-bit ARM® processor platforms, may be implemented with various memory-mapped input/output (MMIO) devices that are not on an enumerable bus such as PCIe (Peripheral Component Interconnect Express). This is comparable to devices on the ISA or LPC buses on x86 platforms. However, the devices on such x86 platforms were well-known with industry-agreed configuration (memory ranges and interrupt lines), whereas on ARM® systems, these "bus-less" devices (termed as such because they are not on an enumerable bus) can be the latest and the most advanced NIC (network interface card) controllers, storage, and so on, whose configuration is described through firmware configuration tables.

For example, in ARM® server platforms, firmware that is compliant with the ACPI (Advanced Configuration and Power Interface) specification (hereinafter referred to as "ACPI firmware") describes the bus-less devices through DSDT (Differentiated System Description Table), which defines a tree of devices through an interpreted language called AML (ACPI Machine Language). For each bus-less device defined therein, the DSDT contains a descriptor which describes the device's fixed MMIO ranges and interrupt vectors used, as well as its hardware identifier (_HID) and compatible identifier (_CID). These identifiers, hereinafter referred to as device IDs, are used by an operating system (OS) driver to bind to a particular device by matching on a set of IDs supported by the OS driver.

Often, the OS driver is unable to bind to a particular device because the device IDs of bus-less devices have not been standardized and may not be recognizable by the OS driver. For example, a common serial UART (Universal Asynchronous Receiver/Transmitter) known as PL011, may be described using any of the following device IDs, ARMH0011, LNRO000A, LINA000A, or PNP0500 (the format usually conforming to the notation, AAAA####, where AAAA is the assigned vendor, and #### is the assigned device number). In certain situations, the device IDs may be too generic to be recognized. For example, some NICs have device IDs, ETH0000 or SATA0000.

As a result, the OS may not be able to bind a driver to a device if the device ID is too generic, or if a device is known by several device IDs and the one described in the DSDT of the device does not match any of the ones recognized by the OS. In addition, there may be situations where the OS has drivers that can support the device but does not recognize the device ID because the device was developed after the OS was released. In such situations, the OS is unable to bind a driver to the device without an OS patch being installed.

SUMMARY

One or more embodiments make a bus-less device appear as a PCI device to system software by emulating the PCI configuration space for the device inside a secure-mode platform firmware (hereinafter referred to as "secure monitor"). This is accomplished by treating a portion of un-backed system memory addresses as the PCI configuration space for an emulated PCI segment containing the bus-less device. When system software accesses the PCI configuration space to probe or configure the PCI device, an exception is raised and handled by the secure monitor running at a higher privilege level than the system software. The secure monitor, in handling the exception, responds to the system software as if a real physical PCI adapter were present, by returning PCI configuration data to the system software and acting on system software writes to configuration control registers.

A method of binding a driver to a device in a computer system having system software that executes at a first privilege level and a secure monitor that executes at a second privilege level that is higher than the first privilege level, includes the steps of: probing a configuration space of the device for configuration data including a device identifier; trapping into the secure monitor which returns the configuration data including the device identifier; identifying a driver suitable for the device using the device identifier; and binding the driver to the device.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

FIG. 4 is a flow diagram of method steps for booting a computer system.

FIG. 5 is a flow diagram of method steps for enumerating emulated PCI segments, according to an embodiment.

FIG. 6 provides an example DSDT that describes one PCI segment, the device's fixed MMIO ranges, and interrupt vectors used.

DETAILED DESCRIPTION

Figure 1:
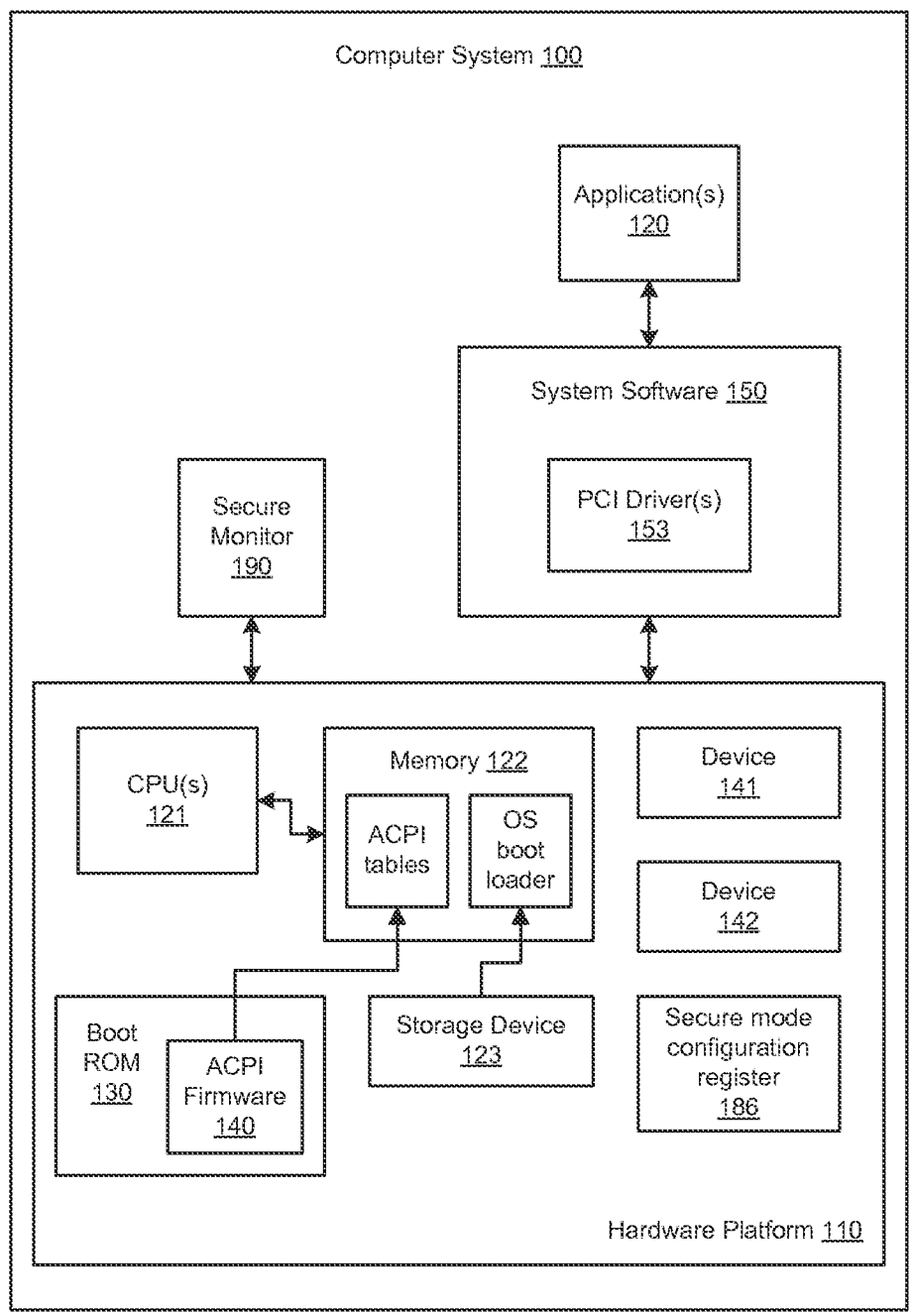
FIG. 1 is a block diagram of a computer system in which embodiments may be implemented.

FIG. 1 is a block diagram of a computer system, shown as computer system 100, in which embodiments may be implemented. Computer system 100 may be constructed on a conventional, typically server-class, hardware platform 110, and includes one or more central processing units (CPUs) 121, system memory 122, a persistent storage device 123, which may be hard disk drive, a solid state drive, or a hybrid drive, a boot ROM (read-only memory) 130 that stores system firmware for computer system 100, which includes ACPI (Advanced Configuration and Power Interface) firmware 140, and a plurality of devices 141, 142 (e.g., ACPI devices). Devices 141, 142 may be a NIC controller, a host bus adapter, a graphics adapter, and the like. In the embodiments, devices 141, 142 may be configured as SOC devices and are MMIO devices that are not on an enumerable bus such as a PCI (Peripheral Component Interconnect) bus.

As further shown in FIG. 1, system software 150 is installed on top of hardware platform 110 and supports the execution of applications 120. In one embodiment, system software 150 is a hypervisor and applications 120 are emulated computing instances, e.g., emulated machines having a guest operating system or containers that do not have an operating system. System software 150 includes various drivers for devices of hardware platform 110, including drivers for PCI devices, depicted as PCI drivers 153. In another embodiment, system software 150 is an operating system, such as Microsoft Windows® or Linux®, and applications 120 are applications that have been developed for the operating system.

When computer system 100 is powered on, boot code stored in boot ROM 130 takes control and executes the system firmware including ACPI firmware 140. The system firmware installs a secure monitor 190 which is a software module that executes in secure mode, i.e., at the highest privilege level, and then ACPI firmware 140 loads various ACPI tables into memory 122. Then, boot control is transferred to a boot loader for system software 150 that is loaded into memory from a particular location in storage device 123, e.g., loaded from a master boot record (MBR). The entire boot sequence is described below in conjunction with FIG. 4.

In conventional usage, the secure mode is used to mitigate security concerns (e.g., confidentiality, integrity, authenticity, etc.). According to embodiments, secure monitor 190 is installed on top of hardware platform 110 to execute in secure mode, so that it can exploit capabilities unavailable in non-secure mode. Secure monitor 190 operates transparently to system software 150, which executes at a lower privilege level. In operation, secure monitor 190 responds to memory accesses to "emulated" devices that are not backed by hardware platform 102, generating appropriate responses transparently to non-secure units and non-secure software executing in hardware platform 110, such as system software 150.

One example of computer system 100 has an ARM® Cortex®-A57 (based on the ARM®v8 architecture) as CPU 121. The ARM® Cortex®-A57 supports TrustZone security extensions which provide secure modes of operation. The ARM® Cortex®-A57 is commercially available from ARM Holdings of Cambridge, United Kingdom.

To enable secure monitor 190 to correctly identify the non-secure instruction that corresponds to each access to an emulated device, accesses to the address ranges for which secure monitor 190 provides emulated devices are performed synchronously with the non-secure instructions. More specifically, accesses to such address ranges are performed without any reordering, buffering, or caching. Specifying memory access patterns in such a manner may be done in any technically feasible fashion, such as configuring page table entry flags in a memory management unit of CPU 121.

Figure 2:
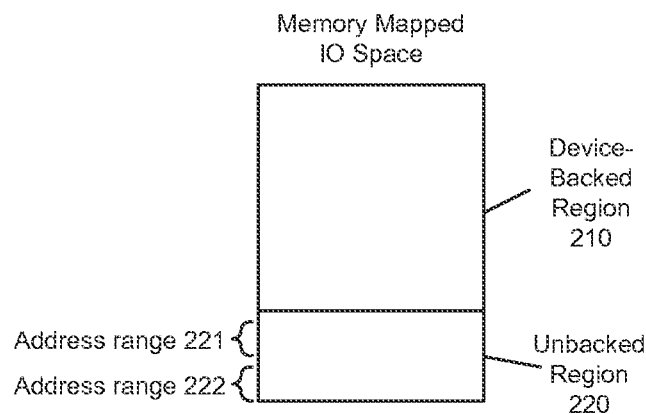
FIG. 2 is a conceptual diagram of a mapped memory space that includes device-backed and unbacked regions.

FIG. 2 is a conceptual diagram of a memory mapped IO space that includes device-backed region 210 and unbacked region 220. In general, device-backed region 210 is properly backed by hardware included in hardware platform 110. For example, an address in device-backed region 210 may correspond to a particular device that is a physical unit, e.g., memory 122, within hardware platform 110. By contrast, an address in unbacked region 220 is not backed by any hardware included in hardware platform 110. According to embodiments, an address within one of non-overlapping address ranges, e.g., address range 221 and address range 222, within unbacked region 220 is designated as a memory address of a configuration space of the actual device that is being emulated as a PCI device by secure monitor 190 (e.g., device 141 or device 142, hereinafter referred to as the "emulated PCI device"). Access to that memory address traps into secure monitor 190 and triggers an action by secure monitor 190 to emulate an action on the emulated PCI device.

Figure 3:
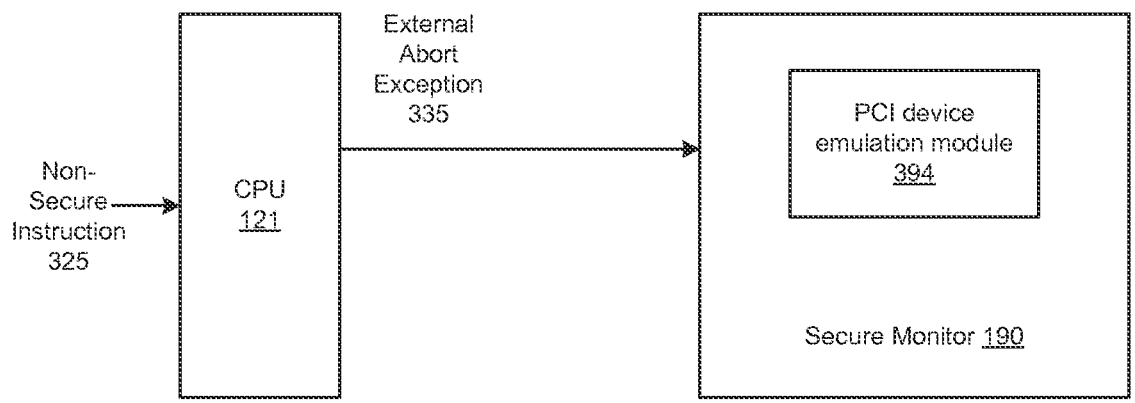
FIG. 3 depicts processing flow of a non-secure instruction that causes an external abort exception.

FIG. 3 depicts the processing of a non-secure instruction 325 that causes an external abort exception 335. As described in U.S. application Ser. No. 14/312,249, the entire contents of which are incorporated by reference herein, external abort exception 335 may be handled by system software 150 or secure monitor 190 according to bits of a secure mode configuration register 186 depicted in FIG. 1. In the embodiments illustrated herein, the bits of secure mode configuration register 186 are set such that external abort exception 335 traps into secure monitor 190 and is handled by secure monitor 190, in particular, PCI device emulation module 394 of secure monitor 190.

PCI device emulation module 394 provides an emulation of the PCI Extended Configuration Access Mechanism (ECAM) for two arrangements. The first arrangement is one in which a MMIO device resides at a fixed non-configurable address. In this case, each such MMIO device resides on a separate PCI segment and the ACPI firmware ensures that the segment resources (i.e., PCI aperture ranges) correspond to the MMIO device resources, such that the system software's PCI configuration logic assigns the only valid resource ranges to the emulated device. The second arrangement is one in which the MMIO device has assignable addresses. In this case, more than one MMIO device may reside on the emulated PCI segment, with segment resources describing a range, portions of which could be assigned to any of the MMIO devices. Additionally, PCI device emulation module 394 emulates BAR (base address register) writes to the ECAM space to re-base each MMIO device, which corresponds to a particular BAR. Each emulated PCI segment has a corresponding, emulated ECAM MMIO region, to be accessed through non-secure instructions that cause external abort exceptions, that are trappable by PCI device emulation module 394 as described before An example of access in either arrangement described above is a non-secure instruction 325 issued by system software 150 to probe the configuration space of the emulated PCI device and includes an address within unbacked region 220. Upon receiving non-secure instruction 325, CPU 121 determines that the address included in non-secure instruction 325 is not within device-backed region 210 and generates external abort exception 335. PCI emulation module 394 treats the access as a read or a write into the ECAM space, and based on the address, figures out which ECAM region and thus which PCI segment the access is for. Then the offset from the base of the ECAM region is decoded into a PCI address, consisting of bus, device, function, and register numbers. PCI emulation module 394 then emulates read/write access to the specified register of the specified emulated PCI adapter, which includes returning the device ID, vendor ID, and other header information of the PCI configuration space being emulated by PCI device emulation module 394. For example, if the following mappings are specified in the ECAM space: A[27:20]=Bus Number, A[19:15]=Device Number, A[14:12]=Function Number, A[11:18]= Extended Register Number, A[7:2]=Register Number, and A[1:0]=Byte Offset, the PCI configuration space for a device (Bus, Device, Function) is:

ECAM_Base+address(Bus Number, Device Number, Function Number, 0); and a register in the PCI configuration space is:

ECAM_Base+address(Bus Number, Device Number, Function Number, register).

Thus, the example configuration space is a large flat memory-mapped space which contains ECAM information for each segment laid out sequentially, i.e., the ECAM space of segment n+1 sequentially follows the ECAM space of segment n.

An example of access in the second arrangement is a non-secure instruction 325 issued by system software 150 to write a new device base address into a BAR register of the emulated PCI device. PCI device emulation module 394, in response thereto, writes the new base address into the actual MMIO device (e.g., device 141 or device 142 that is being shimmed with the emulated PCI device) in a device-specific manner. As a result of this write, the MMIO device responds to the range of addresses the system software assigned to the emulated PCI device.

The creation of the emulated PCI segments as described above occurs during the boot-up process, the steps of which are illustrated in FIG. 4. When computer system 100 is powered on, boot code stored in boot ROM 130 takes control and executes the system firmware including ACPI firmware 140. The system firmware conducts power-on self-tests of all the devices at step 408, and installs secure monitor 190 at step 410. Then, at step 412, ACPI firmware 140 loads various ACPI tables into memory 122.

One of the ACPI tables is a DSDT (Differentiated System Description Table), which defines a tree of devices through an interpreted language called AML (ACPI Machine Language). Each of the emulated PCI segments is described within the DSDT as a separate root bridge device with MMIO ranges and interrupt vectors that are mapped to global system interrupt vectors (GSIV) that are used by the actual device being emulated as a PCI device. FIG. 6 provides an example of a DSDT that describes the first arrangement, where there is a single root bridge and a single PCI device on a segment of the root bridge with the resource MMIO space corresponding to the range used by the MMIO device. For the second arrangement described above, the resource MMIO space for the root bridge would correspond to a range, any parts of which may be assigned as register bases by system software 150 to the emulated PCI devices below the bridge (and thus to the MMIO device). The ECAM region for each segment, as described above, corresponds to the root bridge object in the DSDT and each such ECAM region covers all buses and devices behind the root bridge, up to the maximum bus number specified for the root bridge object in the DSDT.

At step 414, the system firmware accesses the MBR to begin loading system software 150. Then, system software 150 enumerates the ACPI tables at step 416, and discovers DSDT descriptions of the PCI segments, including the emulated PCI segments described above, at step 418. At step 420, system software 150 performs enumeration for each of the PCI segments in the manner known in the art. During this process, system software 150 reads from (i.e., probes) and writes to (i.e., programs) the configuration space of the emulated PCI devices, as a result of which external abort exceptions are triggered and PCI device emulation module 394 emulates the reads and writes requested by system software 150 to configure devices 141, 142 as PCI devices. Further details of PCI enumeration are provided below in conjunction with FIG. 5.

During step 420, system software 150 probes for the device ID and the vendor ID of each emulated PCI device. After step 420, system software 150 loads various drivers for devices that are part of hardware platform 110, including PCI drivers 153 (step 422), and binds the PCI drivers to the emulated PCI devices based on the device ID of the emulated PCI device (step 424). In one example implementation, device 141 is a network controller and is emulated as a PCI network controller by PCI device emulation module 394, and device 142 is a storage controller and is emulated as a PCI storage controller by PCI device emulation module 394. During step 424, system software 150 first determines that the PCI driver for the PCI network controller supports the emulated device ID of device 141 before binding that driver to device 141. Similarly, system software 150 first determines that the PCI driver for the PCI storage controller supports the emulated device ID of device 142 before binding that driver to device 142.

FIG. 5 is a flow diagram of method steps for enumerating emulated PCI segments, which is a depth-first search of the PCI segment hierarchy, according to an embodiment. These method steps are executed by system software 150 after PCI segments, both physical and emulated, have been enumerated, and are the same steps executed for physical PCI segments.

The depth-first scanning of the PCI device hierarchy for a particular segment begins at step 510, where system software 150 selects the PCI segment being scanned. (e.g., SEG=0). Then, at step 511, system software 150 computes, in a depth-first search manner, the PCI address (BDF, short for "Bus:Device.Function") for the next device to probe. At step 514, system software 150 probes the PCI configuration space, using an offset access into the ECAM region for the selected segment, for PCI configuration data. As described above, step 514 causes an external abort exception because the memory address of the PCI configuration space is in unbacked region 220 and a trap into secure monitor 190. PCI device emulation module 394, in response, returns PCI configuration data for the actual device (device 141 or device 142) it is emulating as a PCI device or known reserved values if there is no PCI device at the selected BDF address. If said reserved values were returned as determined at step 515, system software 150 stops the scanning (step 516). Otherwise, system software 150 reads and writes any needed configuration space registers at step 518, including BARs. A write to the BAR for such a device in the first arrangement is simply discarded, as there is only a single emulated PCI device on the segment, the root bridge space is just the range decoded by the actual MMIO device, and the written value necessary matches the root bridge space. Alternatively, if the device is one with a second arrangement described above, writes to the BARs for such a device are handled by actually changing the MMIO bases for the MMIO devices backing the emulated PCI devices affected, as there can be more than one MMIO device being emulated and the root bridge space is large enough that the system software can apportion it to the devices in that segment. The process flow after step 518 returns to step 511, where system software 150 computes, in a depth-first manner, the PCI address (BDF) for the next PCI device for probe and configuration.

In summary, embodiments allow ACPI devices to be emulated as PCI devices so that existing PCI drivers can be used for the ACPI devices. This is accomplished by mapping the PCI ECAM space of the segment on which the emulated PCI device resides to an unbacked memory address. When system software 150 accesses the PCI ECAM space to probe for PCI configuration data or to program the BARs of the PCI ECAM space, an exception is raised and the exception is handled by a secure monitor that is executing at a higher privilege level than the system software 150. The secure monitor in handling the exception emulates the PCI configuration space access of the emulated PCI device corresponding to the ECAM address accessed. Thus, it returns a PCI device's configuration space register data on reads or changes or attempts to change a PCI device's configuration space registers on writes.

Certain embodiments as described above involve a hardware abstraction layer on top of a host computer. The hardware abstraction layer allows multiple contexts or emulated computing instances to share the hardware resource. In one embodiment, these emulated computing instances are isolated from each other, each having at least a user application running therein. The hardware abstraction layer thus provides benefits of resource isolation and allocation among the emulated computing instances. In the foregoing embodiments, emulated machines are used as an example for the emulated computing instances and hypervisors as an example for the hardware abstraction layer. As described above, each emulated machine includes a guest operating system in which at least one application runs.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. In a computer system having system software that executes at a first privilege level and a secure monitor that executes at a second privilege level,
   a method of binding a driver to a device, comprising:
   while a CPU in the computer system executes system software at the first privilege level, accessing a memory address associated with a configuration space of the device for configuration data including a device identifier, wherein the memory address is not backed by any hardware in the computer system and accessing the memory address causes an exception, the exception invoking an exception vector having an address to which the CPU branches;
   responsive to the exception vector, branching into the secure monitor executing at the second privilege level, the secure monitor returning the configuration data including the device identifier to the system software, wherein the second privilege level is higher than the first privilege level, and wherein the CPU provides modes of operation and the first and second privilege levels correspond to the modes provided by the CPU;
   identifying a driver suitable for the device using the device identifier; and
   binding the driver to the device.

2. The method of claim 1, further comprising:
   upon power-up of the computer system,
   loading system configuration tables which describe a segment and an associated data structure that includes the configuration space of the device.

3. The method of claim 2, wherein the system configuration tables further describe a mapping of interrupts on the segment to global system interrupt vectors.

4. The method of claim 2, wherein the system configuration tables describe first and second segments and associated first and second data structures, the first data structure including a configuration space of a first device, that is referenced with a memory address within a first range of memory addresses, and the second data structure including a configuration space of a second device, that is referenced with a memory address within a second range of memory addresses that does not overlap with the first range of memory addresses.

5. The method of claim 2, wherein the segment is emulated and not backed by any hardware in the computer system.

6. The method of claim 1, wherein the configuration data comprises PCI device configuration data and the secure monitor returns additional PCI device configuration data.

7. A non-transitory computer readable medium comprising instructions to be executed in a computer system at a first privilege level, to cause the computer system to carry out a method of binding a driver to a device, said method comprising:

while a CPU in the computer system executes system software the first privilege level, accessing a memory address associated with a configuration space of the device for configuration data including a device identifier, wherein the memory address is not backed by any hardware in the computer system and accessing the memory address causes an exception, the exception invoking an exception vector having an address to which the CPU branches;

responsive to the exception vector, branching into a secure monitor executing at the second privilege level, the secure monitor returning the configuration data including the device identifier to the system software, wherein the second privilege level is higher than the first privilege level, and wherein the CPU provides modes of operation and the privilege levels at which the system software and the secure monitor execute correspond to the modes provided by the CPU;

identifying a driver suitable for the device using the device identifier; and binding the driver to the device.

8. The non-transitory computer readable medium of claim 7, wherein the memory address associated with the configuration space of the device is described in system configuration tables that are loaded into memory of the computer system upon power-up of the computer system.

9. The non-transitory computer readable medium of claim 7, wherein the configuration data comprises PCI device configuration data and the secure monitor returns additional PCI device configuration data.

10. A computer system having a processing unit and system memory into which system software that executes a first privilege level and a secure monitor that executes at a second privilege level, have been loaded, wherein the processing unit executes the system software to bind a driver to a device by carrying out the steps of:

while executing system software at the first privilege level, accessing a memory address associated with a configuration space of the device for configuration data including a device identifier, wherein the memory address is not backed by any hardware in the computer system and accessing the memory address causes an exception, the exception invoking an exception vector having an address to which the processing unit branches;

responsive to the exception vector, branching into the secure monitor executing at the second privilege level, the secure monitor returning the configuration data including the device identifier to the system software, wherein the second privilege level is higher than the first privilege level, and wherein the processing unit in the computer system provides modes of operation and the privilege levels at which the system software and the secure monitor execute correspond to the modes provided by the processing unit;

identifying a driver suitable for the device using the device identifier; and binding the driver to the device.

11. The computer system of claim 10, wherein the processing unit, upon power-up of the computer system, loads system configuration tables which describe a segment and an associated data structure that includes a configuration space of the device.

12. The computer system of claim 11, wherein the system configuration tables further describe a mapping of interrupts on the segment to global system interrupt vectors.

13. The computer system of claim 11, wherein the system configuration tables describe first and second segments and associated first and second data structures, the first data structure including a configuration space of a first device, that is referenced with a memory address within a first range of memory addresses, and the second data structure including a configuration space of a second device, that is referenced with a memory addresses within a second range of memory addresses that does not overlap with the first range of memory addresses.

14. The computer system of claim 11, wherein the segment is emulated and not backed by any hardware in the computer system.

* * * * *